United States Patent
Shen

(10) Patent No.: US 8,243,831 B2
(45) Date of Patent: Aug. 14, 2012

(54) IMAGE DEBLOCKING FILTER AND IMAGE PROCESSING DEVICE UTILIZING THE SAME

(75) Inventor: Yu-Chen Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 455 days.

(21) Appl. No.: 12/616,196

(22) Filed: Nov. 11, 2009

(65) Prior Publication Data

US 2011/0107390 A1 May 5, 2011

(30) Foreign Application Priority Data

Oct. 30, 2009 (CN) .......................... 2009 1 0309161

(51) Int. Cl.
*H04N 11/02* (2006.01)
(52) U.S. Cl. .................................. 375/240.29
(58) Field of Classification Search ............. 375/240.29; 708/445; 712/E9.07; 382/303, 304
See application file for complete search history.

(56) References Cited

U.S. PATENT DOCUMENTS

| | | | | |
|---|---|---|---|---|
| 4,153,932 | A * | 5/1979 | Dennis et al. | 712/27 |
| 6,882,688 | B1 * | 4/2005 | Oohashi et al. | 375/240.24 |
| 8,036,484 | B2 * | 10/2011 | Jiang et al. | 382/264 |
| 2001/0052064 | A1 * | 12/2001 | Chaudhry et al. | 712/225 |
| 2004/0267856 | A1 * | 12/2004 | Macy, Jr. | 708/524 |
| 2006/0078052 | A1 * | 4/2006 | Dang | 375/240.24 |
| 2006/0115002 | A1 * | 6/2006 | Kim et al. | 375/240.29 |
| 2006/0268985 | A1 * | 11/2006 | Liang et al. | 375/240.16 |
| 2007/0071106 | A1 | 3/2007 | Graham et al. | |
| 2008/0126812 | A1 * | 5/2008 | Ahmed et al. | 713/189 |
| 2008/0140999 | A1 * | 6/2008 | Gong | 712/214 |

* cited by examiner

*Primary Examiner* — Mehrdad Dastouri
*Assistant Examiner* — Mohammed Rahaman
(74) *Attorney, Agent, or Firm* — Altis Law Group, Inc.

(57) ABSTRACT

An image deblocking filter comprises an instruction memory. A decision unit executes instructions stored in the instruction memory to decide a first path or a second path of instruction fetching from the instruction memory to an execution unit. The execution unit is operable to execute a first instruction in the decided path the in one clock cycle. The first instruction represents a complex of three arithmetic operations and two bitwise operations for three variable operands and two constant operands. The first and second paths respectively realize deblocking formulae of a first and a second image compression standard.

10 Claims, 13 Drawing Sheets

| | | | | | | | | | | | |
|---|---|---|---|---|---|---|---|---|---|---|---|
| L00: | ASH (dual, −, not_end) | 0 | 0 | P1 | X | 0 | 0 | | | | |
| | // R1 = 0, R2 = 0, R3 = P1, TR = X, A = 0, S = 0 | | | | | | | | | | |
| L01: | ASH (dual, ÷, not_end) | 0 | P0 | Q0 | Y | 1 | 1 | | | | |
| | // R1 = 0, R2 = P0, R3 = Q0, TR = Y, A = 1, S = 1 | | | | | | | | | | |
| L02: | ASH (dual, ÷, not_end) | X | Y | P2 | Z | 0 | 1 | | | | |
| | // R1 = X, R2 = Y, R3 = P2, TR = Z, A = 0, S = 1 | | | | | | | | | | |
| L03: | CLP (dual, not_end) | Z | TC0 | W | | | | | | | |
| | // R1 = Z, R2 = TC0, TR = W | | | | | | | | | | |
| L04: | ASH (dual, ÷, end) | 0 | P1 | W | P1 | 0 | 0 | | | | |
| | // R1 = 0, R2 = P1, R3 = W, TR = P1 | | | | | | | | | | |

FIG. 5

| L10: | ASH (dual, -, not_end) | 0 | 0 | Q1 | x | 0 | 0 |
| --- | --- | --- | --- | --- | --- | --- | --- |
| | // R1 = 0, R2 = 0, R3 = Q1, TR = x, A = 0, S = 0 | | | | | | |
| L11: | ASH (dual, +, not_end) | 0 | Q0 | P0 | y | 1 | 1 |
| | // R1 = 0, R2 = Q0, R3 = P0, TR = y, A = 1, S = 1 | | | | | | |
| L12: | ASH (dual, +, not_end) | x | y | Q2 | z | 0 | 1 |
| | // R1 = x, R2 = y, R3 = Q2, TR = z, A = 0, S = 1 | | | | | | |
| L13: | CLQ (dual, not_end) | z | TC0 | w | | | |
| | // R1 = z, R2 = TC0, TR = w | | | | | | |
| L14: | ASH (dual, +, end) | 0 | Q1 | w | Q1 | 0 | 0 |
| | // R1 = 0, R2 = Q1, R3 = w, TR = Q1 | | | | | | |

FIG. 6

| L20: | ASH (dual, −, not_end) | 0 | 0 | P1 | X | 0 | 0 |
|---|---|---|---|---|---|---|---|
| | // R1 = 0, R2 = 0, R3 = P1, TR = X, A = 0, S = 0 | | | | | | |
| L21: | ASH (dual, +, not_end) | 0 | P0 | Q0 | Y | 1 | 1 |
| | // R1 = 0, R2 = P0, R3 = Q0, TR = Y, A = 1, S = 1 | | | | | | |
| L22: | ASH (dual, +, end) | X | Y | P2 | Z | 0 | 1 |
| | // R1 = X, R2 = Y, R3 = P2, TR = Z, A = 0, S = 1 | | | | | | |
| L23: | CLP (dual, not_end) | Z | TC0 | W | | | |
| | // R1 = Z, R2 = TC0, TR = W | | | | | | |
| L24: | ASH (dual, +, end) | 0 | P1 | W | P1 | 0 | 0 |
| | // R1 = 0, R2 = P1, R3 = W, TR = P1 | | | | | | |

FIG. 7

| | | | | | | |
|---|---|---|---|---|---|---|
| L30: | ASH (dual, -, not_end) | 0 | p3 | p6 | X | 0 | 0 |
| | // R1 = 0, R2 = p3, R3 = p6, TR = X, A = 0, S = 0 |
| L31: | ASH (dual, -, not_end) | 0 | p4 | p5 | W | 0 | 0 |
| | // R1 = 0, R2 = p4, R3 = p5, TR = W, A = 0, S = 0 |
| L32: | ASH (dual, +, not_end) | W | 0 | 0 | 1 | 0 | 0 |
| | // R1 = W, R2 = 0, R3 = 0, TR = 1, A = 0, S = 0 |
| L33: | ASH (dual, +, not_end) | 1 | W | 0 | J | 0 | 0 |
| | // R1 = 1, R2 = W, R3 = 0, TR = J, A = 0, S = 0 |
| L34: | ASH (dual, -, end) | X | 0 | J | a0 | 4 | 3 |
| | // R1 = X, R2 = 0, R3 = J, TR = a0, A = 4, S = 3 |

FIG. 8

| Instruction | Mode | Register/Flag Selection | | | | Intermediate Data | | Description |
|---|---|---|---|---|---|---|---|---|
| SAC | Dual/non-dual | R1 | R2 | R3 | TF | | | TF=(\|R1-R2\|<R3)?1:0 |
| JMP | | F1 | | | | A | | If(F1), jump to A |
| APR | Dual/non-dual | F1 | | | TP | A1 | A2 | If(F1), TP=A1; Else, TP=A2 |
| | End/not-end | | | | | | | |
| MFA | Dual/non-dual | F1 | F2 | F3 | F4 | TF | | TF=F1&F2&F3&F4 |

FIG. 11

| Instruction | Mode | Register/Flag Selection | | | | Data | | Description |
|---|---|---|---|---|---|---|---|---|
| | | R1 | R2 | R3 | TR | A | S | |
| ASH | Dual/non-dual | R1 | R2 | R3 | TR | A | S | TR=[(R1<<1)+R2+R3+A]>>S |
| | ± | | | | | | | or |
| | End/not-end | | | | | | | TR=[(R1<<1)+R2−R3+A]>>S |
| CLP | Dual/non-dual | R1 | R2 | | TR | | | TR=Clip(R1,−R2,+R2) |
| | End/not-end | | | | | | | |
| UCP | Dual/non-dual | R1 | R2 | | TR | | | TR=Clip[(R1+R2),0,255] |
| | ± | | | | | | | or |
| | End/not-end | | | | | | | TR=Clip[(R1−R2),0,255] |

FIG. 12

IMAGE DEBLOCKING FILTER AND IMAGE PROCESSING DEVICE UTILIZING THE SAME

BACKGROUND

1. Technical Field

The disclosure relates to image processing, and more particularly to an image deblocking filter and image processing device utilizing the same.

2. Description of Related Art

Current image coding standards typically arrange video frames as a composite of video blocks, where a block serves as a basic unit of inter-frame or intra-frame coding. For example, the MPEG-4 standard developed by the Moving Picture Experts Group (MPEG) divides a video frame into video blocks referred to as "macroblocks." Different standards may support variously sized video blocks. The H.264 standard supports video blocks of 16 by 16, 16 by 8, 8 by 16, 8 by 8, 8 by 4, 4 by 8, and 4 by 4 pixels.

Block-based inter-frame and/or intra-frame compression to achieve high compression gain, may cause blocky artifacts in a video sequence, which shows perceptible discontinuous edges between adjacent blocks. Different video coding standards, such as H.264, VC-1, and MPEG2, may have different deblocking schemes to reduce the blockish effect. Even a specific standard, such as H.264, may have various deblocking formulae.

Dedicated deblocking circuits may be designed for different deblocking applications. Integrating such dedicated circuits into one device makes the device supportive to multiple video coding schemes but may complicate circuit design and render circuit miniaturization more difficult. This is also inflexible when the device is required to accommodate new deblocking schemes. Running different video coding schemes on a general-purpose processor is more flexible but inefficient.

BRIEF DESCRIPTION OF THE DRAWINGS

FIGS. 5-8 are schematic diagrams showing exemplary sequences of computation stage instructions;

FIG. 11 shows decision stage instructions in a table; and

FIG. 12 shows computation stage instructions in another table.

DETAILED DESCRIPTION

Description of exemplary embodiments of the image deblocking filter and image processing device is given in the following paragraphs which are organized as:

1. System Overview
　1.1 Exemplary Image Processing Device
　1.2 Exemplary Image Deblocking Filter
2. Exemplary Operations of the Deblocking Filter
　2.1 First Example of Instruction Execution
　2.2 Second Example of Instruction Execution
3. Conclusion

1. SYSTEM OVERVIEW

Figure 1A:
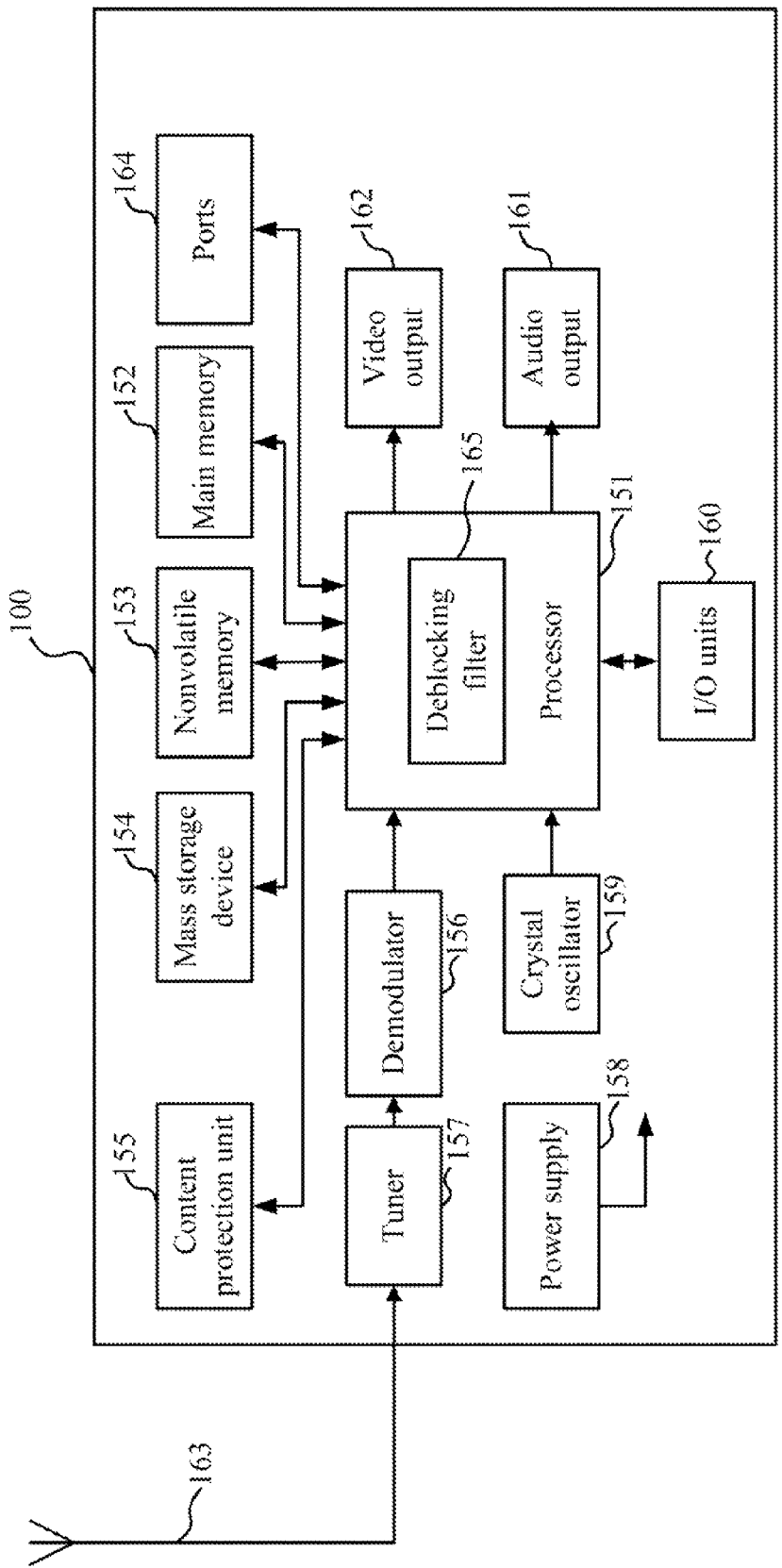
FIG. 1A is a block diagram of an embodiment of an image processing device 100 comprising a deblocking filter 165.

The disclosed image deblocking filter (referred to as deblocking filter in the following) can be implemented in various image processing devices, such as a disc player, a multimedia player, a digital camera, a set top box, a personal digital assistant (PDA), a laptop computer, a desktop computer, or any other device equipped with image processing capabilities. Devices integrated with image processing capabilities may comprise televisions, cell phones, and video conference devices. FIG. 1A is a block diagram of an embodiment of an image processing device 100 comprising an image deblocking filter 165.

1.1 Exemplary Image Processing Device

Figure 1B:
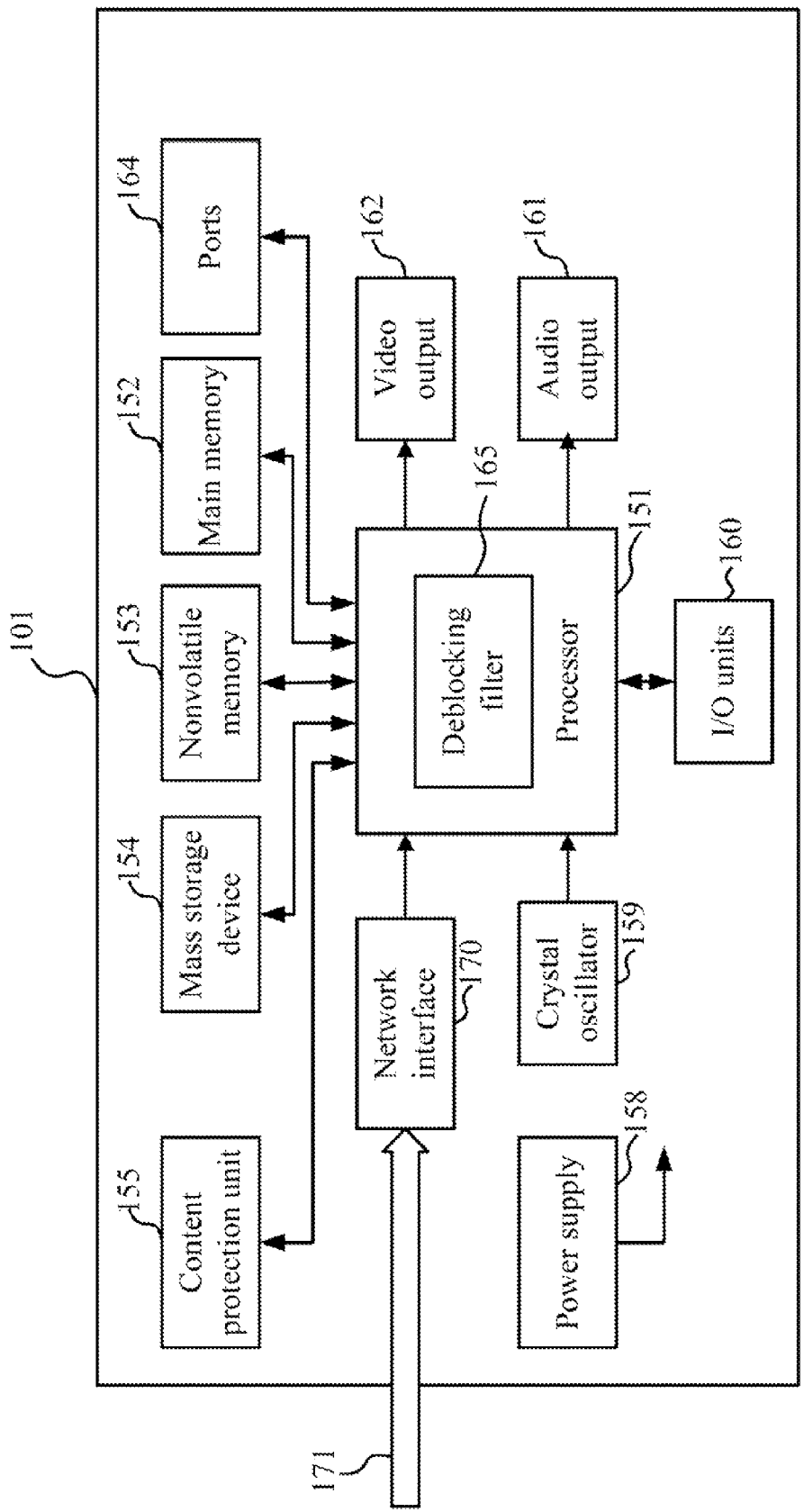
FIG. 1B shows a second embodiment of an image processing device receiving digital content from a network.

The deblocking filter 165 is integrated in a processor 151, which may comprise a central processing unit of the image processing device 100. The processor 151 may be packaged as one chip or a plurality of chips interconnected through buses. A power supply 158 provides electrical power to components of the image processing device 100. A crystal oscillator 159 provides clock signals to the processor 151 and other components of the image processing device 100. Connection of the components in the image processing device 100 is shown in FIG. 1A and may comprise serial or parallel transmission buses. Input and output (I/O) units 160 may comprise control buttons, a seven-segment display, and an infrared receiver or transceiver for communication with a remote control. Ports 164 may be used to connect to various computerized interfaces, such as an external computer for debugging the image processing device 100. The ports 164 may comprise physical ports complying with recommended standard 232 (RS-232) and/or recommended standard 11 (RS-11) defined by Electronics Industries Association (EIA), serial ATA (STATA), and/or high-definition multimedia interface (HDMI). Nonvolatile memory 153 stores an operating system and applications executable by the processor 151. The processor 151 may load runtime processes and data to the main memory 152 and store digital content in a mass storage device 154. The main memory 152 may comprise a random access memory (RAM), such as static RAM (SRAM) or dynamic RAM (DRAM). The nonvolatile memory 153 may comprise an electrically erasable programmable read-only memory (EEPROM) or a flash memory, such as a NOR flash or a NAND flash. A content protection system 155 provides access control to digital content reproduced by the image processing device 100. The content protection system 155 may comprise memory and necessary devices for implementing digital video broadcasting—common interface (DVB-CI) and/or conditional access (CA). The image processing device 100 may obtain digital content from broadcast signals through an antenna 165, tuner 157, and a demodulator 156. FIG. 1B shows a second embodiment of an image processing device 101 that obtains digital content from an information network 171, such as the Internet, through a network interface 170. A video output unit 162 comprises filters and amplifiers for filtering and amplifying video signals output by the processor 151. An audio output unit comprises a digital to analog converter converting audio signals output by the processor 151 from digital format to analog format.

1.2 Exemplary Image Deblocking Filter

Figure 2:
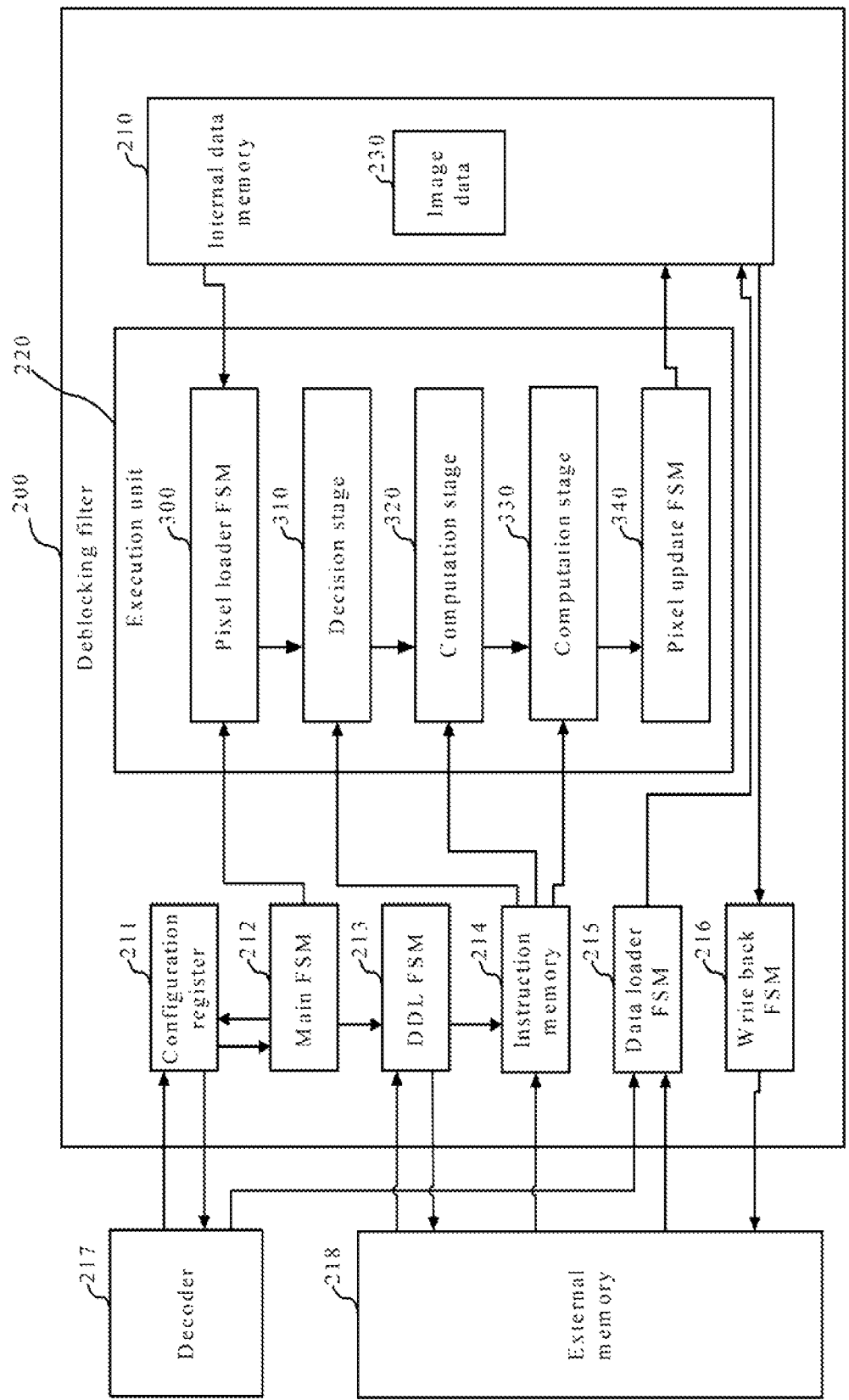
FIG. 2 is a block diagram of an exemplary embodiment of a deblocking filter.

FIG. 2 is a block diagram of an embodiment of an image deblocking filter 200 which is an exemplary embodiment of the deblocking filter 165 in FIGS. 1A and/or 1B. Components of the image deblocking filter 200 in FIG. 2 may be implemented by circuits. The deblocking filter 200 is connected to a video decoder 217 and an external memory 218. The decoder 217 is operable to decode images or video clips in various formats, such as MPEG-1, MPEG-2, and MPEG-4 standards developed by MPEG, H.263 and H.264 standards developed by International Telecommunication Union Telecommunications (ITU-T), QuickTime™ technology developed by Apple Computer Inc, and VC-1 technology developed by Microsoft Corporation. The decoder 217 may configure settings in a configuration register 211 based on which a main finite state machine (FSM) 212 controls operations of the deblocking filter 200. The external memory 218 may comprise the main memory 152 or a cache with larger capacity than an internal data memory 210. The internal data memory 210 comprises a SRAM, in one example. The external memory 218 stores deblocking instructions and image data decoded by the decoder 217. A dynamic link library (DLL) FSM 213 loads deblocking instructions from the external memory 218 to the instruction memory 214, and a data loader FSM 215 loads image data from the external memory 218 to the internal memory 210. An execution unit 220 retrieves deblocking instructions from the instruction memory 214 and image data from the internal memory 210, performs deblocking by executing and applying the retrieved instruction to the retrieved image data, and stores deblocked image data to the internal memory 210. A write-back FSM 216 transfers and stores the deblocked image data to the external memory 218.

2. EXEMPLARY OPERATIONS OF THE DEBLOCKING FILTER

Figure 3:
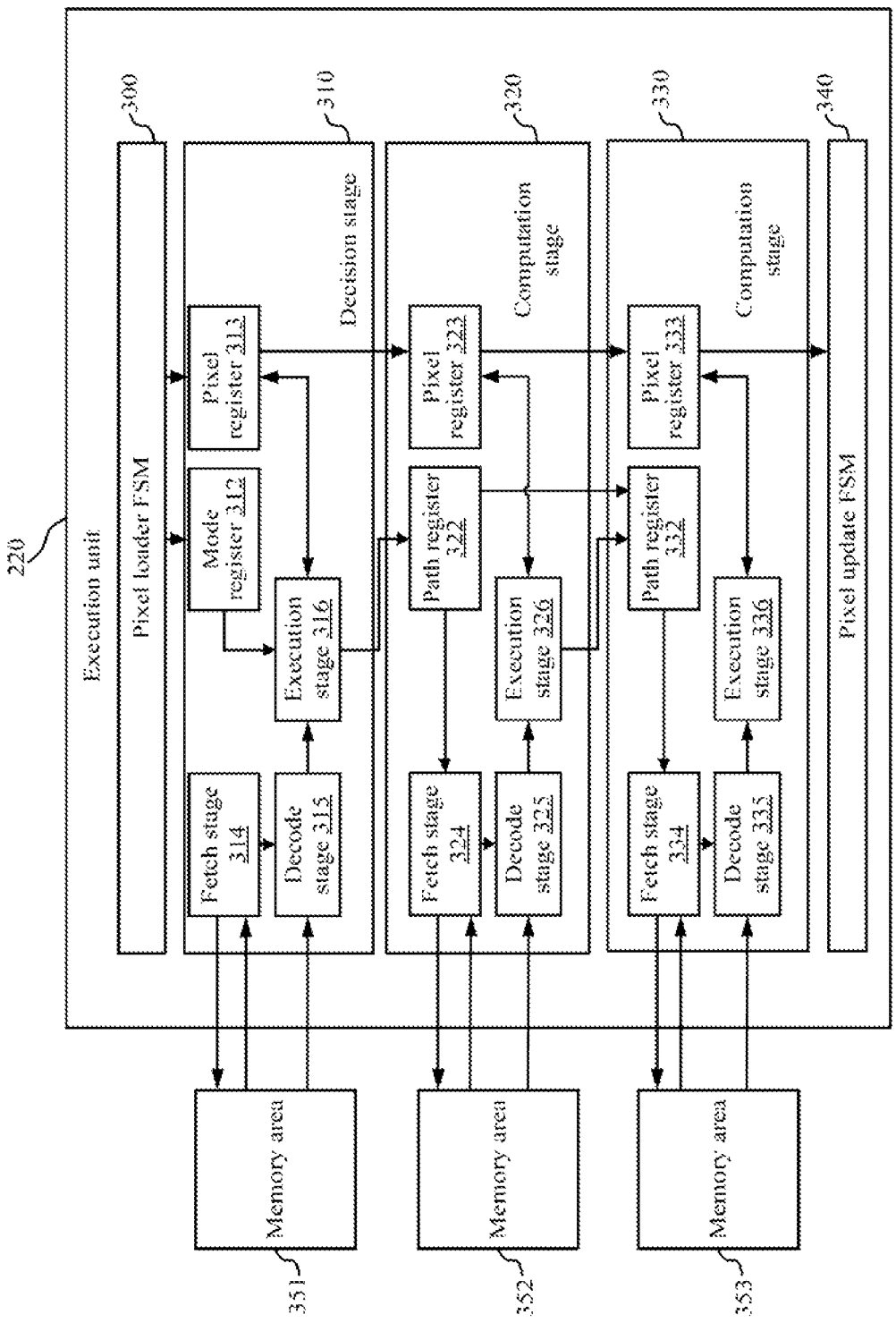
FIG. 3 is a block diagram of an exemplary embodiment of an execution unit of the deblocking filter.

FIG. 3 shows an embodiment of an execution unit 220. Components of the execution unit 220 in FIG. 3 may be implemented by circuits. The instruction memory 214 may comprise memory areas 351-352. After the decoder 217 completes decoding a set of image data, such as a still image, a frame, or a macroblock, and outputs the set of decoded image data to the external memory 218, the main FSM 212 determines image format of the image data, and writes register values in the configuration register 211 corresponding to a deblocking mode suitable for the determined image format. The data loader FSM 215 loads the set of decoded image data to the internal memory 210 as image data 230.

A deblocking mode comprises a plurality of deblocking policies, each associated with one of a plurality of deblocking formulae. Each deblocking policy is represented by decision stage instructions stored in a memory area 351 of the instruction memory 214, and each deblocking formula is represented by computation stage instructions stored in memory areas 352 and 353 of the instruction memory 214. A pixel loader FSM 300 writes register values in the mode register 302 corresponding to the deblocking mode and load pixels of the image data 230 from the internal data memory 210 to a pixel register 313. In a decision stage 310, a fetch stage 314 retrieves decision stage instructions from the memory area 351 of the instruction memory 214 based on the register values in the mode register 302, a decode stage 315 decodes and an executed stage 316 executes the retrieved decision stage instructions to determine an instruction fetching path corresponding to a deblocking formula, and writes register values corresponding to the determined path in a path register, such as path register 322 or 332. Register values in the path register 323 may be transferred to the path register 333.

Pixel data in the pixel register 313 may be transferred to a pixel register 323. In a computation stage 320, a fetch stage 324 retrieves computation stage instructions from the memory area 352 based on the register values in the path register 322, a decode stage 325 decodes and an execution stage 326 executes the retrieved computation stage instructions to generate and stores intermediate data or deblocked pixel values in the pixel register 323. Data in the pixel register 323 may be transferred to a pixel register 333. Register values in the path register 322 may be transferred to the path register 332. Similarly, in a computation stage 330, a fetch stage 334 retrieves computation stage instructions from the memory area 353 based on the register values in the path register 332, a decode stage 335 decodes and an execution stage 336 executes the retrieved computation stage instructions to generate and stores intermediate data or deblocked pixel values in pixel register 333. The path register 332 may receive register value from output of the execution stage 316 in the decision stage 310 or from the path register 322.

The fetch stage 324, the decode stage 325, and the execution stage 326 form three stages of a pipeline in the computation stage 320. The path register 322 and the pixel register 323 may be included in the fetch stage 324. The decode stage 325 and the execution stage 326 may be integrated as one stage that completes decoding and execution of one instruction in one clock cycle. Similarly, the fetch stage 334, the decode stage 335, and the execution stage 336 form three stages of a pipeline in the computation stage 330. The path register 332 and the pixel register 333 may be included in the fetch stage 334. The decode stage 335 and the execution stage 336 may be integrated as one stage that completes decoding and execution of one instruction in one clock cycle.

A pixel update FSM 340 stores deblocked pixel values to the internal memory 210 to update the image data 230. The write-back FSM 216 transfers and stores the updated image data 230 to the external memory 218.

Instruction sets of the deblocking filter 220 are detailed in the following paragraphs. FIG. 11 shows decision stage instructions in a table. Operations of a computation stage that execute respective instructions are explained in "description" column of the table.

Each of the instructions SAC, APR, and MFA is accompanied with mode bits of which one bit denotes whether the instruction is in dual or non-dual mode, and another bit denotes whether the instruction is an ending instruction. An instruction in dual mode when executed by a computation stage requires the computation stage to perform execution of single instruction stream and multiple data streams (SIMD). An ending instruction when executed by a computation stage requires the computation stage to switch execution of a set of instructions following the ending instruction from the computation stage to another computation stage.

R1, R2, R3, TP, and TF are names of registers, and A, A1, A2 are variables referred to as constant operands. R1, R2, and R3 may be referred to as variable operands. F1-F4 are flags each having binary states. The symbol "=" represents an assignment operation where a value on the right side of the symbol is assigned to a variable or a register on the left side of the symbol. The symbol "−" represents an arithmetic subtraction operation. "TF=(|R1−R2|<R3)?1:0" states that in execution of the instruction SAC, if (|R1−R2|<R3) is true, TF is assigned 1, and if (|R1−R2|<R3) is not true, TF is assigned 0. A computation stage executing the JMP switches instruction execution to an address targeted by A only if the flag F1 is true. A computation stage executing the APR assigns value A1 to the register TP if the flag F1 is true or A2 to the register TP if the flag F1 is not true. The symbol "&" denotes bitwise binary AND operation. FIG. 12 shows computation stage instructions in another table.

TR is a register name. R1, R2, and R3 may be referred to as variable operands. A and S are variables referred to as constant operands. The symbol "+" represents an arithmetic adding operation. The symbols "<<" and ">>" respectively represent bitwise operations of left and right arithmetic bit shifts. Specifically, for a real number variable x and a positive integer variable y, notation x>>y represents arithmetic right shift of a two's complement integer representation of x by y binary digits. Each bit shifted into the most significant bit (MSB) as a result of the right shift shall have a value equal to the MSB of x prior to the shift operation. Conversely, notation x<<y represents arithmetic left shift of a two's complement integer representation of x by y binary digits. Each bit shifted into the least significant bit (LSB) as a result of the left shift has a value equal to 0. An ASH instruction is a complex of three arithmetic operations and two bitwise operations for three variable operands R1-R3 and two constant operands A and S. The instruction ASH is accompanied with a mode bit specifying an operation for registers R2 and R3. When the mode bit represents adding operation "+", the ASH instruction represents TR=[(R1<<1)+R2+R3+A]>>S. When the mode bit represents subtraction operation "−", the ASH instruction represents TR=[(R1<<1)+R2−R3+A]>>S. The function of Clip( ) is defined in the following:

$$Clip(a, b, c) = \begin{cases} b; & a < b \\ c; & a > c \\ a; & \text{otherwise} \end{cases} \quad (1)$$

The variables b and c are respectively lower and upper limits for clipping the value of variable a. A clipping instruction, such as CLP or UCP, when executed by an execution stage directs the deblocking filter to perform a clipping operation that restricts an operand value of the instruction to a upper limit and a lower limit.

Figure 4:
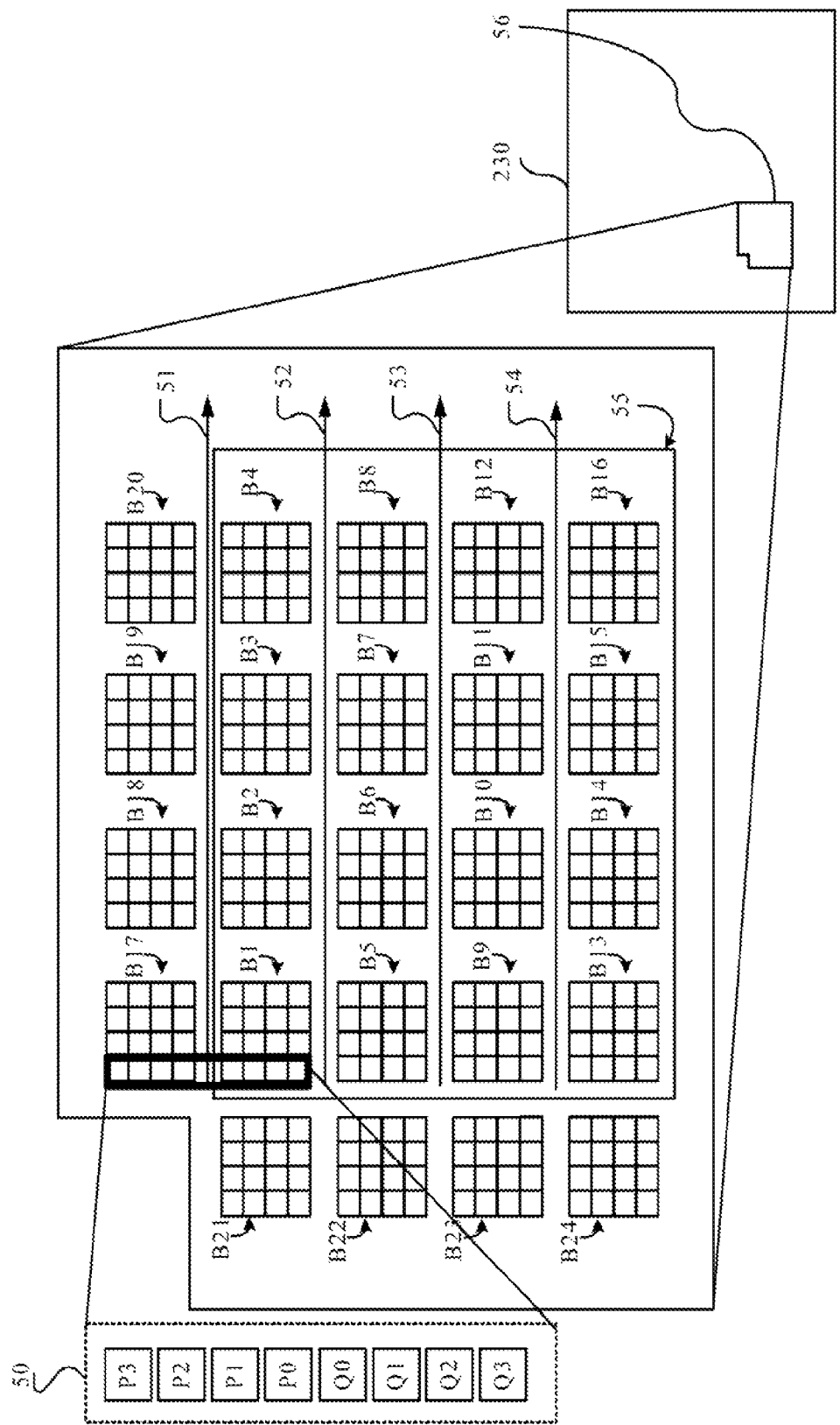
FIG. 4 is a schematic diagram showing a portion of an image.

FIG. 4 shows edges between image blocks of the image data 230. The image data 230 comprises an area 56 which comprises blocks B17-B24 and a macroblock 55 formed by blocks B1-B16. As shown, each of the blocks B1-B24 comprises 16 pixels represented by constituent squares. The blocks and pixels shown in FIG. 4 are arranged according to geometry thereof in the image 230. After the data loader FSM 215 loads the image data 230 from the external memory 218 to the internal memory 210, the pixel loader 300 loads a unit of pixels of the image data 230 to pixel register 313 to deblock edges of the image data 230. For example, if the pixel loader 300 loads a unit 50 of pixels comprising pixels P0-P3 of the block B17 and pixels Q0-Q3 of the block B1 to pixel register 313, with arrows 51-54 respectively representing horizontal edges associated with the macroblock 55, and an edge represented by an arrow is composed of two rows of blocks beside the arrow, such as an edge represented by the arrow 51 is composed of blocks B1-B4 and B17-B20, then in deblocking the edge represented by the arrow 51, the pixel loader 300 may load eight neighboring pixels on the right side of pixels P0-P3 and Q0-Q3 as a next unit of pixels for subsequent deblocking operations.

Deblocking may separately apply to the luma and chroma components of pixels of the unit 50. The order of deblocking respective vertical and horizontal edges is detailed in image coding standards.

2.1 First Example of Instruction Execution

Various deblocking formulae for different image coding standards are represented by different paths of fetching computation stage instructions to a computation stage. The decision stage 310 executes instructions to output such paths. For example, the decision stage 310 outputs an execution path corresponding to a deblocking formula:

$$P1bSLT4(P2,P1,P0,Q0)=P1+Clip3(-TC0,TC0,(P2+ \\ ((P0+Q0+1)>>1)-(P1<<1))>>1) \quad (2)$$

TC0 is a variable. The function Clip3(x,y,z) in the formula (2) is defined in H.264 as:

$$Clip3(x, y, z) = \begin{cases} x; & z < x \\ y; & z > y \\ z; & \text{otherwise} \end{cases} \quad (3)$$

The formula (2) corresponds to a formula in H.264 specification for calculating value of a pixel P1. The decision stage 310 executes instructions representing a deblocking policy to determine an execution path comprising instructions L00-L04 based on boundary strength and sampling flag (SF) of each edge of the image data 230. The SF may comprise FilterSamplesFlag described in H.264 standard. FIG. 5 shows the output execution path comprising instructions L00-L04. Comments for instructions L00-L04 are respectively presented after "//". W, X, Y, and Z are intermediate variables.

The fetch stage 324 sequentially fetches the instructions L00-L04 to the decode stage 325. The decode stage 325 and the execution stage 326 respectively decode and execute the instructions L00-L04. Execution of the instruction L00 yields X=−P1. Execution of the instruction L01 yields Y=(P0+Q0+1)>>1. Execution of the instruction L02 yields Z=[(−P1)<<1+Y+P2]>>1. Execution of the instruction L03 yields W=Clip(Z,−TC0, TC0). Execution of the instruction L04 yields a result of the formula (2) to update the pixel P1.

Each of the execution stages 326 and 336 comprises two arithmetic logic units. When decoding an instruction with an asserted dual bit, a decode stage (such as 325 or 335) generates two instances of the instruction and outputs the two instances of the instruction for two different sets of operands to an execution stage. A multiplexer selects and outputs two sets of pixels from a pixel register as the two different sets of operands to the two arithmetic logic units. Two arithmetic logic units in the execution stage connected to the decode stage respectively execute the two instances of the instruction with two different sets of operands received from the multiplexer in the same clock cycle. One of the two sets of operands comprises pixel data symmetric to pixel data in the other set of operands.

Figure 9:
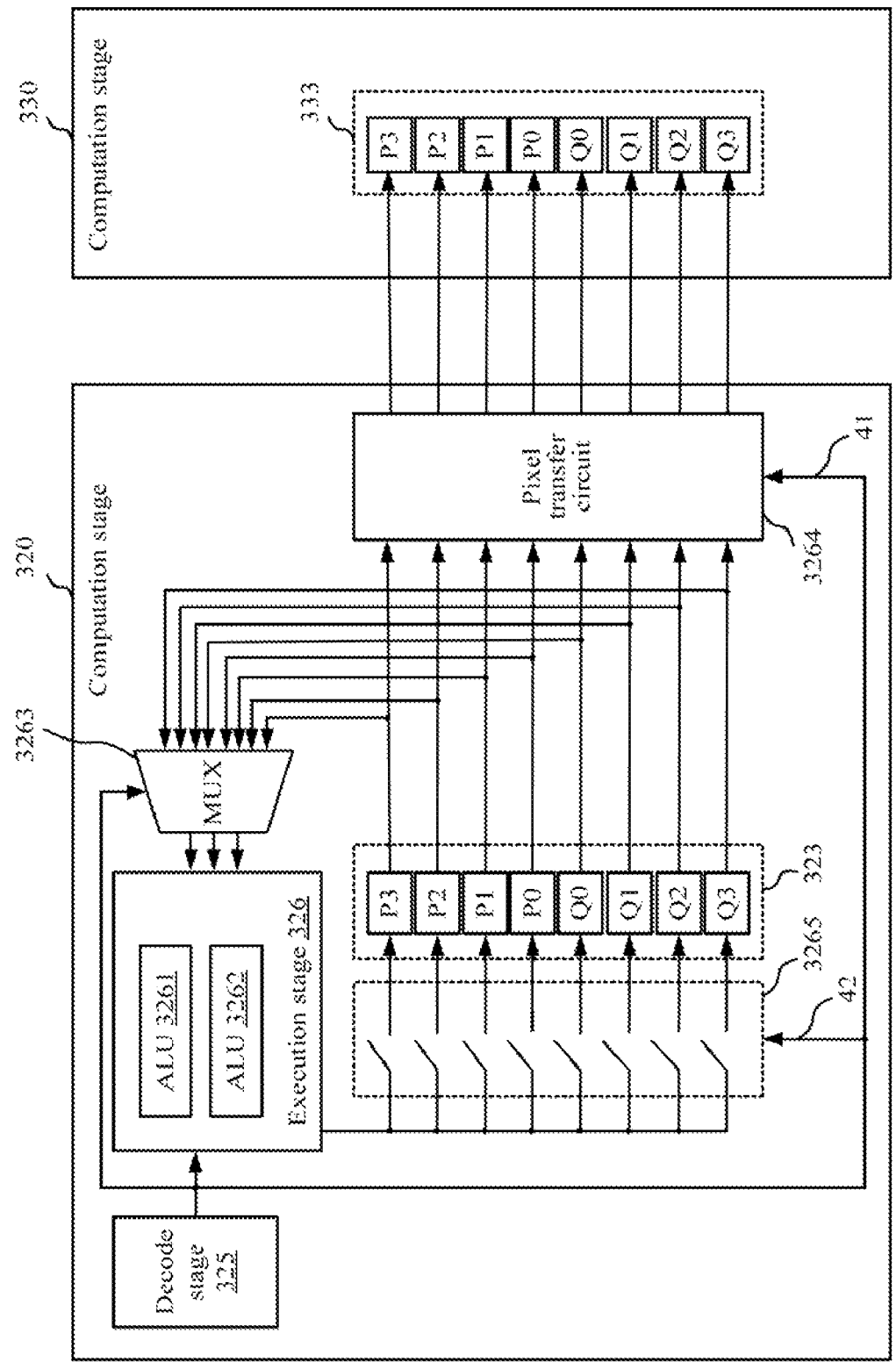
FIG. 9 is a schematic diagram showing an exemplary computation stage.

For example, as shown in FIG. 9, the execution stage 326 comprises arithmetic logic units 3261 and 3262. When decoding the instruction L00 with an asserted dual bit, the decode stage 325 generates and outputs two instances of the instruction L00 to the execution stage 326. The multiplexer 3263 respectively output pixels P1 and Q1 in the pixel register 323 to the arithmetic logic units 3261 and 3262. As shown in FIG. 6, the decode stage 325 generates an instruction L10 as a duplicated instance of instruction L00 with pixel data Q1 symmetric to P1 in the instruction L00 with respect to the edge 51 and pixel geometry in the unit 50 of pixels. The arithmetic logic unit 3261 in the execution stage 326 executes one instance of the instruction L00 with an operand P1 in one clock cycle, and the arithmetic logic unit 3262 executes the duplicated instance of the instruction L00, that is instruction L10, with operands Q1 symmetric to P1 in the same clock cycle. Similarly, the decode stage 325 generates an instruction L11, L12, L13, and L14 as duplicated instances of instructions L01, L02, L03, and L04, and the arithmetic logic units 3262 execute the duplicated instance of the instructions.

Figure 10:
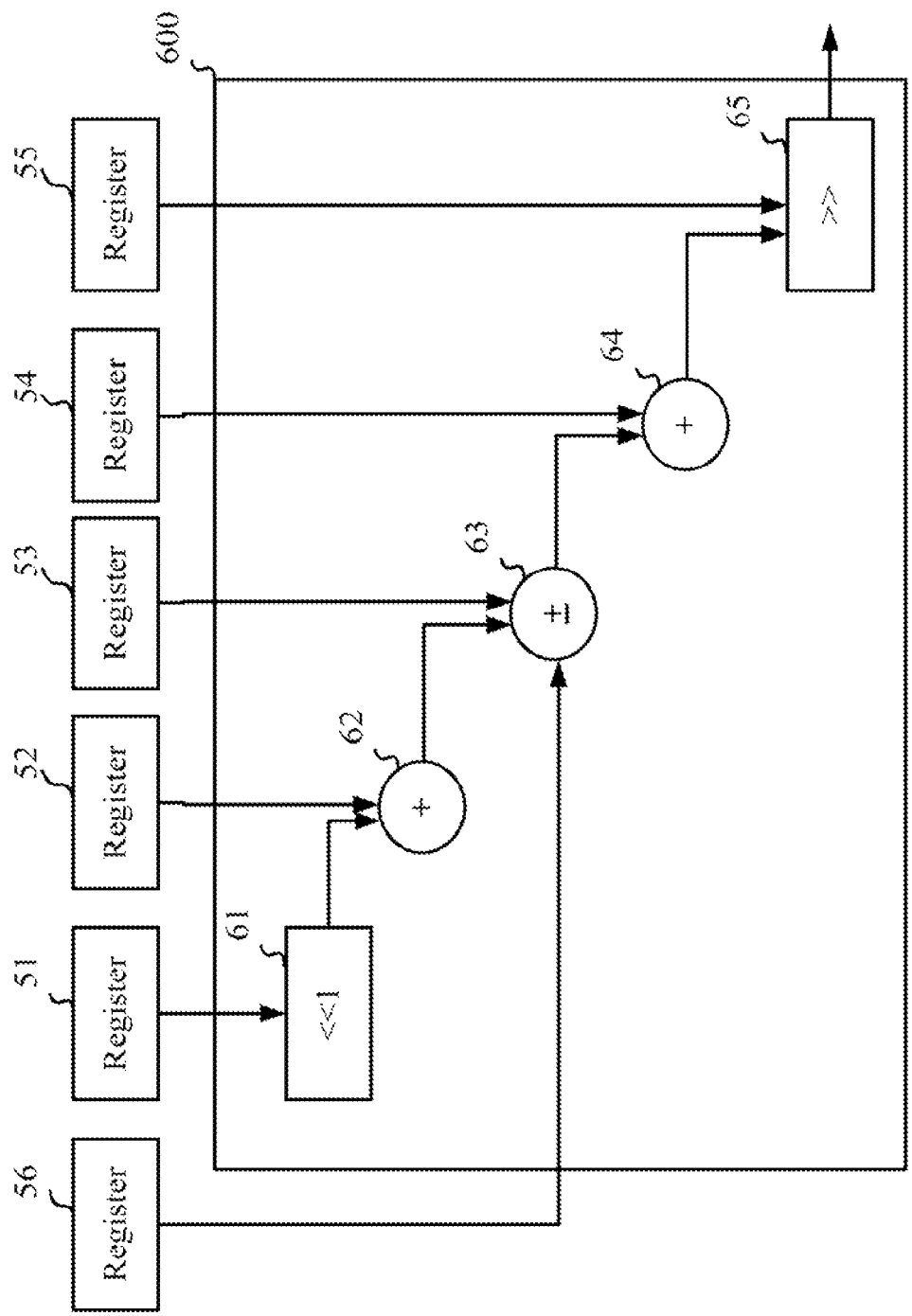
FIG. 10 is a schematic diagram showing an exemplary arithmetic logic unit.

FIG. 10 shows portions of an exemplary arithmetic logic unit of a computation stage. Arrows in FIG. 10 show connection between components. A circuit 600 may be an exemplary embodiment of an arithmetic logic unit in computation stage 320 or 330 and is operable to execute an ASH instruction in one clock cycle. Registers 51-55 respectively store operands R1, R2, R3, A, and S of the instruction ASH. An operator circuit 61 left shifts the value of the register 51 by one bit and outputs a result of the shift. An operator circuit 62 performs an addition operation on the output of the operator 61 and the value of the register 52 and outputs a result of the addition operation to an operator circuit 63. A register 56 stores a decoded mode bit in an instruction specifying an addition operation or a subtraction operation for registers R2 and R3. The operator circuit 63 performs an addition operation or a subtraction operation on received operands based on the mode bit stored in the register 56 and outputs a result of the operation. An operator circuit 64 performs an addition operation on the output of the operator 63 and the value of the register 54 and outputs a result of the addition operation to an operator circuit 65. The operator circuit 65 right shifts the output of the operator 64 by an amount specified by the value of the register 55 and outputs a result of the shift.

When decoding an instruction with an asserted end bit, the decode stage 325 notifies the fetch stage 334 rather than the fetch stage 324 to retrieve a set of instructions following the instruction with an asserted end bit. The decode stage 325 may complete the notification by moving register values from the path register 322 to the path register 332. Additionally, as shown in FIG. 9, a pixel transfer circuit 3264 transfers pixels from the pixel register 323 to the pixel register 333 in response to the asserted end bit transmitted through a bus 41. The decode stage 335 and the execution stage 336 respectively decode and execute the set of instructions, thus to realize inter-computation stage pipelining. For example, the decode stage 325 decodes instructions shown in FIG. 7 in order from first to last. When decoding an instruction L22 with an asserted end bit, the decode stage 325 notifies the fetch stage 324 not to retrieve instructions L23-L24 following the instruction L22 and the fetch stage 334 to retrieve the instructions L23-L24. The decode stage 335 and the execution stage 336 respectively decode and execute the instructions L23-L24. A control circuit 3265 is controlled through control signals in a bus 42 to enable writeback of pixel data from the execution stage 326 to respective registers in the pixel register 323.

2.2 Second Example of Instruction Execution

The VC-1 standard also utilizes various formulae for deblocking including:

$$a0=(2\times(p3-p6)-5\times(p4-p5)+4)>>3 \quad (4)$$

$$a1=(2*(p1-p4)-5*(p2-p3)+4)>>3 \quad (5)$$

$$a2=(2*(p5-p8)-5*(p6-p7)+4)>>3 \quad (6)$$

The p3, p4, p5, and p6 are pixel values which may be luma or chroma values. For example, the decision stage 310 may output an execution path corresponding to the deblocking formula (4) including instructions L30-L34 shown in FIG. 8. The a0-a2, I, J, X, and W are variables. The fetch stage 324 sequentially fetches the instructions L30-L34 to the decode 325. The decode stage 325 and the execution stage 326 respectively decode and execute the instructions L30-L34. Execution of the instruction L30 yields X=(p3−p6). Execution of the instruction L31 yields W=(p4−p5). Execution of the instruction L32 yields I=2W=2(p4−p5). Execution of the instruction L33 yields J=2I+W=5(p4−p5). Execution of the instruction L34 yields a0=(2X−J+4)>>3 which is a result of the formula (4). Similarly, the decision stage 310 may output execution paths corresponding to the formulae (5) and (6). The fetch stage 324 sequentially fetches instructions in the execution paths to the decode 325. The decode stage 325 and the execution stage 326 respectively decode and execute the instructions in the execution paths.

3. CONCLUSION

As previously described, the image processing device may store various instructions for implementing various deblocking methods conforming to various image and video techniques or compression standards, such as VC-1, MPEG2, and H.264. As more instruction for more compression standards are integrated in the instruction memory, the flexibility and standard compatibility of the image processing device 100 is improved. Each computation stage comprises two arithmetic logic units to realize SIMD architecture. Additionally, the two computation stages balance instruction execution in response to end bits in computation stage instructions to realize inter-computation-stage pipelining and improve overall efficiency of the deblock filter circuit. The proposed circuit is suitable for various image processing devices including, but not limited to, set-top boxes, media players, televisions, and video conference devices.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An image deblocking filter, comprising:
   an instruction memory operable to store a plurality of instructions of which a first instruction represents a complex of three arithmetic operations and two bitwise operations for three variable operands and two constant operands;
   an execution unit operable to execute the plurality of instructions stored in the instruction memory, wherein the execution unit comprises a first arithmetic logic unit operable to execute the first instruction in a clock cycle; and
   a decision unit operable to decide one of a first and a second path of fetching the plurality of instructions from the instruction memory to the execution unit, wherein the execution unit when executing instructions according to the first or second path respectively realizes a deblocking formula of a first or a second image compression standard, and the chosen of the first and the second paths comprises the first instruction;
   wherein the first instruction when executed by the execution unit directs the deblocking filter to perform the three arithmetic operations and two bitwise operations comprising:
   a left shifting operation as a first bitwise operation on a first variable operand;

a first adding operation as a first arithmetic operation on the shifted first variable operand and a second variable operand;

a second adding operation or a subtraction operation as a second arithmetic operation based on a second mode bit in the instruction, wherein the second adding operation comprises adding the result of the first adding operation and a third variable operand, and the subtraction operation comprises subtracting the third variable from the result of the first adding operation;

a third adding operation as a third arithmetic operation on the result of the second arithmetic operation and a first constant operand; and a right shifting operation as a second bitwise operation on the result of the third adding operation by the value of a second constant operand.

2. The image deblocking filter as claimed in claim 1, wherein the plurality of instructions comprises a clipping instruction executable with an upper limit and a lower limit, and the clipping instruction when executed by the execution unit directs the execution unit to:

execute a fourth adding operation on two variable operands; and output the result of the fourth adding operation if the result of the fourth adding operation is within a range delimited by the upper and lower limits;

output the upper limit if the result of the fourth adding operation exceeds the upper limit; and output the lower limit if the result of the fourth adding operation is below the lower limit.

3. The image deblocking filter as claimed in claim 1, wherein the execution unit comprises a first and a second computation stage, the first computation stage comprises the first arithmetic logic unit, the first computation stage transfers a set of instructions following the first instruction in the chosen path to the second computation stage in response to a mode setting of the first instruction, and the second computation stage executes the set of instructions.

4. The image deblocking filter as claimed in claim 3, wherein the execution unit comprises the first and a second arithmetic logic unit operable to respectively execute two instances of the first instruction on two sets of operands in the same clock cycle in response to a mode setting of the first instruction.

5. The image deblocking filter as claimed in claim 1, wherein the image deblocking filter operates in a set-top box.

6. An image processing device, comprising an image deblocking filter that comprises:

an instruction memory operable to store a plurality of instructions of which a first instruction represents a complex of three arithmetic operations and two bitwise operations for three variable operands and two constant operands;

an execution unit operable to execute the plurality of instructions stored in the instruction memory, wherein the execution unit comprises a first arithmetic logic unit operable to execute the first instruction in a clock cycle; and a decision unit operable to decide one of a first and a second path of fetching the plurality of instructions from the instruction memory to the execution unit, wherein the execution unit when executing instructions according to the first or second path respectively realizes a deblocking formula of a first or a second image compression standard, and the chosen one of the first and the second paths comprises the first instruction;

wherein the first instruction when executed by the execution unit directs the deblocking filter to perform the three arithmetic operations and two bitwise operations comprising:

a left shifting operation as a first bitwise operation on a first variable operand;

a first adding operation as a first arithmetic operation on the shifted first variable operand and a second variable operand;

a second adding operation or a subtraction operation as a second arithmetic operation based on a mode setting of the instruction, wherein the second adding operation comprises adding the result of the first adding operation and a third variable operand, and the subtraction operation comprises subtracting the third variable from the result of the first adding operation;

a third adding operation as a third arithmetic operation on the result of the second arithmetic operation and a first constant operand; and a right shifting operation as a second bitwise operation on the result of the third adding operation by the value of a second constant operand.

7. The image processing device as claimed in claim 6, wherein the plurality of instructions comprises a clipping instruction executable with an upper limit and a lower limit, and the clipping instruction when executed by the execution unit directs the execution unit to:

execute an fourth adding operation on two variable operands; and output the result of the fourth adding operation if the result of the fourth adding operation is within a range delimited by the upper and lower limits;

output the upper limit if the result of the fourth adding operation exceeds the upper limit; and output the lower limit if the result of the fourth adding operation is below the lower limit.

8. The image processing device as claimed in claim 6, wherein the execution unit comprises a first and a second computation stage, the first computation stage comprises the first arithmetic logic unit, the first computation stage transfers a set of instructions following the first instruction in the decided path to the second computation stage in response to a mode setting of the first instruction, and the second computation stage executes the set of instructions.

9. The image processing device as claimed in claim 8, wherein the execution unit comprises the first and a second arithmetic logic unit operable to respectively execute two instances of the first instruction on two sets of operands in the same clock cycle in response to a mode setting of the first instruction.

10. The image processing device as claimed in claim 6, wherein the image processing device is a set-top box.

* * * * *